UNITED STATES PATENT OFFICE.

CARL RUDER, OF WANDSBEK, NEAR HAMBURG, GERMANY.

PROCESS OF MAKING ISOPRENE.

1,087,261.  Specification of Letters Patent.  Patented Feb. 17, 1914.

No Drawing.  Application filed September 16, 1913.  Serial No. 790,013.

*To all whom it may concern:*

Be it known that I, CARL RUDER, doctor of philosophy, manufacturer, a subject of the King of Bavaria, residing at Wandsbek, near Hamburg, in the Kingdom of Prussia, German Empire, have invented certain new and useful Improvements in Processes of Making Isoprene, of which the following is a specification.

Tilden (*Soc.* 46, 417), and recently Harries (*Ann.* 383, 228) have shown that the decomposition of vapor of turpentine oil by means of incandescent metal wires will produce isoprene, although only with a very small yield. The last mentioned investigator has, however, obtained better yields by using limonene or dipentene instead of turpentine oil.

The production of dipentene forms the subject of the process described in German Patent No. 254665, according to which terpineols, terpines or their hydrates are heated at temperatures below 500 degrees centigrade with non-acid water-expelling substances having a catalytic action.

I have discovered that terpineol, or terpine hydrate, which latter compound, in certain circumstances, by dehydration yields terpineol, and is therefore to be considered as closely related to terpineol, the term "terpineol substance" being hereafter employed to designate either or both these compounds and to include oils containing either or both of these compounds; may be converted directly into isoprene by heating the vapors thereof in a suitable manner. In operating in this manner, it is unnecessary to employ a water-expelling substance having a catalytic reaction.

When working under ordinary pressure the yields are fairly high, but they are increased by heating the vapors in a partial vacuum or by diluting the vapors with a neutral gas. Gaseous products are not produced in any considerable quantity by "splitting off", which is contrary to what is the case in the processes of German Patents Nos. 252499 and 241895.

The ordinary commercial terpineol is, as is well known, a mixture of various isomeric compounds having the formula $C_{10}H_{18}O$ which except one, are derived from cyclohexene

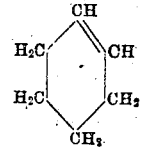

This one compound is a derivative of cyclohexane, being the 1-methyl-4-isopropenyl cyclo-hexanol (1), having a melting point of 32 to 33 degrees C.:

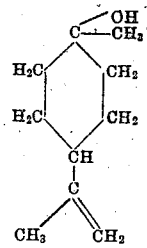

According to German Patent No. 241895 isoprene has already been produced from another derivative of cyclohexanol, namely 1-methyl-cyclohexanol (1)

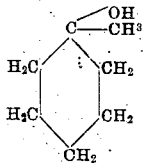

Obviously, however, it could not be deduced therefrom that terpineol which is mainly composed of derivatives of cyclohexene, would likewise yield isoprene when heated to high temperatures.

Example: Terpineol or hydrated terpine or oils containing these substances are brought into strong ebullition, and the apparatus is so constructed that the vapors must pass (at, or preferably below, atmospheric pressure) over an incandescent spiral. The resulting isoprene vapor is first led through a slightly warmed reflux cooler, and is then condensed in a descending cooler, while the fractions of high boiling points flow back into the apparatus. The crude isoprene thus produced is then purified by fractional distillation, after it has been previously freed by distillation over sodium from any terpineol that may have passed over.

What I claim is:—

1. A process of producing isoprene which comprises submitting the vapor of a terpineol substance under a pressure not exceeding atmospheric, to a temperature sufficiently high to produce decomposition of the cyclic compounds.

2. A process of making isoprene which comprises passing the vapor of terpineol over a heated metal spiral, at a temperature sufficiently high to produce decomposition of the cyclic compounds, with the production of isoprene.

In testimnoy whereof I affix my signature in presence of two witnesses.

DR. CARL RUDER.

Witnesses:
ERNEST H. L. MUMMENHOFF,
IDA CHRISP. HAFERMANN.